United States Patent [19]

Escarsega et al.

[11] Patent Number: 5,691,410
[45] Date of Patent: Nov. 25, 1997

[54] WATER DISPERSIBLE LOW-REFLECTANCE CHEMICAL RESISTANCE COATING COMPOSTION

[75] Inventors: John A. Escarsega, Stafford, Va.; Kestutis G. Chesonis, Baltimore, Md.

[73] Assignee: The United States of America as represented by the Secretary of the Army, Washington, D.C.

[21] Appl. No.: 669,258

[22] Filed: Jun. 21, 1996

[51] Int. Cl.$^6$ .............................. C08J 3/00; C08K 3/20; C08L 75/00

[52] U.S. Cl. .......................... 524/591; 524/425; 524/539; 524/839; 524/840

[58] Field of Search ...................... 524/539, 591, 524/839, 840, 425

[56] References Cited

U.S. PATENT DOCUMENTS 5,344,873  9/1994  Blum ................................. 524/840

*Primary Examiner*—Patrick Niland
*Attorney, Agent, or Firm*—Milton W. Lee; Alain L. Bashore; John E. Holford

[57] ABSTRACT

A water dispersible low-reflectance coating composition which is a CARC composition and results in a coating that is flexible at ambient and sub-zero temperatures. The composition is a three component system, where the first component includes: hydroxyl-functional polyurethane, pigments, polymeric beads, emulsion of hydrophobic solids, micro-milled calcium carbonate, anti-settling agent, dispersing agent, water solvent, and non-ionic emulsion. The second component includes polyisocyanate and a solvent, while the third component is water solvent.

9 Claims, 3 Drawing Sheets

|  | Weight Percent(%) |
|---|---|
| COMPONENT I | |
| Polyester resin | 33.33 |
| Pigments | 15.39 |
| Polymeric beads | 10.82 |
| Emulsion of hydrophobic solids | 0.2628 |
| Micro-milled calcium carbonate | 0.26 |
| Anti-settling agent | 13.01 |
| Dispersing Agent | 0.3931 |
| Water Solvent | 19.13 |
| Non-ionic emulsion (35% solids) | 6.79 |
| Adhesion Promoter | 0.643 |
| Total Weight | 100.00 |
| | |
| COMPONENT II | |
| Polyisocyanate | 75.00 |
| Solvent | 25.00 |
| Total Weight | 100.00 |
| | |
| COMPONENT III | |
| Water Solvent | 100.00 |
| Total Weight | 100.00 |

FIG 1

| Color | Visual (Y) | Chromaticity x | y | Infrared Min. | Max. | Allowable Ratio | Min |
|---|---|---|---|---|---|---|---|
| Dark Green 34082 | 0.071-0.91 | 0.339 | 0.390 | - | 60.0 | | 5.2 |
| Green 383 34094 | 0.063-0.83 | 0.328 | 0.365 | - | 60.0 | | 5.2 |
| Field Drab 33105 | 0.093-.117 | 0.309 | 0.389 | 25.0 | 35.0 | | - |
| Earth Yellow 33245 | 0.228-.263 | 0.420 | 0.395 | 30.0 | 40.0 | | - |
| Sand 33303 | 0.284-.323 | 0.360 | 0.366 | 55.0 | 65.0 | | - |
| Brown 383 30051 | 0.060-.080 | 0.357 | 0.342 | 8.0 | 20.0 | | - |
| Tan 686 33440 | 0.360-.400 | 0.368 | 0.364 | 62.0 | 72.0 | | - |
| Black 37030 | 0.030-0.41 | 0.310 | 0.315 | 0.0 | 15.0 | | - |
| Aircraft Green 34031 | - | - | | - | 7.0 | | - |
| Interior Aircraft Black 37031 | - | - | | - | 7.0 | | - |
| Aircraft Gray 36300 | - | - | | - | | | 15.0 |
| Dark Sandstone 33510 | - | - | | - | 45.0 | | - |

FIG 2

| Wavelength (Nanometers) | % Reflectance Max. | Min. | Wavelength (Nanometers) | % Reflectance Max. | Min. |
|---|---|---|---|---|---|
| 600 | 10.2 | - | 760 | 59.5 | 40.0 |
| 610 | 9.8 | - | 770 | 61.5 | 42.0 |
| 620 | 9.8 | - | 780 | - | 42.0 |
| 630 | 9.8 | - | 790 | - | 42.0 |
| 640 | 9.5 | - | 800 | - | 42.0 |
| 650 | 9.5 | - | 810 | - | 42.0 |
| 660 | 10.0 | - | 820 | - | 42.0 |
| 670 | 10.5 | 4.0 | 830 | - | 42.0 |
| 680 | 13.0 | 5.8 | 840 | - | 42.0 |
| 690 | 21.5 | 8.5 | 850 | - | 42.0 |
| 700 | 28.0 | 11.0 | 860 | - | 42.0 |
| 710 | 35.8 | 15.0 | 870 | - | 42.0 |
| 720 | 41.0 | 19.0 | 880 | - | 42.0 |
| 730 | 48.5 | 25.0 | 890 | - | 42.0 |
| 740 | 51.8 | 30.0 | 900 | - | 42.0 |
| 750 | 56.0 | 36.3 | | | |

FIG 3

WATER DISPERSIBLE LOW-REFLECTANCE CHEMICAL RESISTANCE COATING COMPOSTION

BACKGROUND OF THE INVENTION

1. Field of the Invention

The present invention generally relates to coating compositions and more specifically, to water dispersible low-reflectance chemical agent resistance coating compositions.

2. Description of Prior Art

Low observable coatings are materials developed to provide electro-optical signature reduction. There are four bands in the electromagnetic spectrum which enemy sensors can use to seek and detect targets. The current camouflage chemical Agent Resistant Coatings (CARC) addresses two of these bands: the visual and near infrared (IR). The three color woodland pattern and the desert tan match the visual effects of the background and, in the near IR, the green color matches the sharp reflectance rise of chlorophyll present in all green foliage. The first camouflage coating to combine the very low gloss in the visual with the chlorophyll tunnel requirements in the near IR appeared in the mid 1970s as MIL-E-52798, based on an oil modified polyester polymer. In 1985, CARC became the standard camouflage coating for the Army as: MIL-C-46168 (incorporated herein by reference in its entirety), based on a two component urethane consisting of a aliphatic diisocyanate and a saturated polyester.

The basic camouflage topcoat required on all Army combat, combat support, and essential ground support equipment, plus tactical wheeled vehicles and aircraft is military specification MIL-C-46168. Among the many benefits of this coating is resistance to penetration of the paint film by chemical warfare agents. This results in an easier decontamination procedure or, in the absence thereof, a much more rapid return of equipment to service due to the natural environmental breakdown of agents. Additional benefits of the coating are a much longer service life before refinishing is required and improved resistance to corrosion. The Department of the Army (DA) required implementation in fiscal year 1985. Since then, in response to a variety of environmental regulations and worker safety issues, the original material has been found to not be environmentally acceptable. The prior art CARC coatings could not be applied in localities where the current compositions exceeds Volatile Organic Compound (VOC) limits. Flexibility of the applied coating had not been a major or critical element with respect to tactical type equipment. This resulted in subsequent CARC formulations that are satisfactory at ambient temperatures but have difficulty at zero and sub-zero temperatures.

While the prior art has reported using low-reflectance coatings and CARC compositions, none have established a basis for a specific apparatus that is dedicated to the task of resolving the particular problem at hand. What is needed in this instance is a water dispersible low-reflectance coating composition which is a CARC composition and also results in a coating that is flexible at ambient and sub-zero temperatures.

SUMMARY OF THE INVENTION

It is therefore the object of the invention to provide a water dispersible low-reflectance coating composition which is a CARC composition and also results in a coating that is flexible at ambient and sub-zero temperatures.

According to the invention, there is disclosed a water dispersible low-reflectance coating composition which is a CARC composition and results in a coating that is flexible at ambient and sub-zero temperatures. Polymeric beads provides for a composition that achieves a highly diffuse, low observable coating which eliminates the poor scratch and burnishing characteristics that is associated with prior art CARC. Since the polymeric beads are non-siliceous in composition, the three component formula will tend to provide a greater resistance to chalking and overall improvement to outdoor weathering than current coating systems. When active methanal condensate and polyurethane beads comprise the polymeric beads, there is imparted tremendous matting and reduction in gloss to the coating, yet less material by weight is required compared to formulas using siliceous type extenders of similar gloss values. This reduction in pigment solids reduces the overall pigment volume concentration (PVC) to binder ratio which improves the integrity and chemical resistance of the coating.

The prime pigments are chosen for specific chroma, hue and saturation properties for the camouflage color desired. Certain pigments can simulate a desired reflectance curve detected in the near-IR region. The hydroxyl functional polyurethane dispersion and water dispersible polyisocyanate provide the necessary OH and NCO groups to provide a high performance polyurethane film. The polymeric beads are active flattening agents to impart low gloss and sheen. The remaining additives and modifiers are antisettling, leveling and antifoaming materials. The water is used for viscosity correction and application purposes.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a table of the generic formulation of the coating composition of the invention.

FIG. 2 is a table of color reflectance performance data obtained for a coating of the composition of the preferred embodiment with various pigments.

FIG. 3 is a table of spectra reflectance limit data obtained for a coating utilizing the composition of the preferred embodiment with pigments DARK GREEN 34082 and GREEN 383, 34094.

DETAILED DESCRIPTION OF A PREFERRED EMBODIMENT OF THE INVENTION

Referring now to the drawings, and more particularly to FIG. 1, there is shown a table depicting the three component generic formulation of the coating composition of the present invention. Polymeric beads provides for a composition that achieves a highly diffuse, low observable coating which eliminates the poor mar and burnishing characteristics that is associated with prior art CARC. Since the polymeric beads are non-siliceous in composition, the three component generic formula will tend to provide a greater resistance to chalking and overall improvement to outdoor weathering than current coating systems. This reduction in pigment solids reduces the overall pigment volume concentration (PVC) to binder ratio which improves the integrity and chemical resistance of the coating.

The prime pigments are chosen for specific chroma, hue and saturation properties for the camouflage color desired. Certain pigments can simulate a desired reflectance curve detected in the near-IR region. The hydroxyl functional polyurethane dispersion (considered a polyester resin for the purposes of this invention) and water dispersible polyisocyanate provided the necessary OH and NCO groups to provide a high performance polyurethane film. The polymeric beads are active flattening agents to impart low gloss and sheen. A non-ionic high density polyethylene emulsion is also used. The remaining additives and modifiers are antisettling (sepiolite mineral), leveling and antifoaming materials. The water is used for viscosity correction and application purposes.

The invention is illustrated in the following preferred embodiment in which all parts are by weight. It is understood that the invention is not limited to the specific embodiment disclosed. The low observable diffuse coating, which is comprised of 943 parts, is dispersed using a high speed mill and a grinding media such as sand and/or glass beads to aide in the dispersion process. Fifty percent parts by weight of the hydroxyl functional polyurethane dispersion is dispersed with 92.75 parts by weight of prime pigments to produce the required chroma, hue and saturation along with various flow and antisettling agents which comprise of less than one percent parts by weight of the total mixture. The remaining fifty percent parts by weight of the hydroxyl functional polyurethane is quickly dispersed into the prime paste with 4.1 percent parts by weight of an additional emulsion. Removal of the dispersion media with any suitable mesh and/or screening device permits the final components to be incorporated into the material. Active methanal condensate and polyurethane beads comprise the polymeric beads, which imparts tremendous matting and reduction in gloss to the coating, yet less material by weight is required compared to formulas using siliceous type extenders of similar gloss values. A combination of polyurethane urea material condensate with reactive methyl groups of 6.18 percent parts be weight, with the addition of 11.55 parts of water completes the first component of the three component mixture.

The prime pigments Chrome Oxide, Colhalt Spinel, Magnesium Ferrite, and Red Iron Oxide are primarily for chroma, hue and saturation for a camouflage green. The cobalt and chrome oxide are specifically used to simulate the chlorophyll reflectance curve detected in the near-IR region.

The second component is a blend of a solvent free water dispersible aliphatic polyisocyanate resin based on hexamethylene diisocyanate (HDI) where the NCO content ranges from 18.95 to 19.45 percent and which has an equivalent weight average of 220. The second components constitute 25.63 percent parts by weight of the mixture where 75 parts of the HDI is mixed thoroughly with 25 parts of an appropriate solvent which when combined represent the second component. Finally, when component one and two are properly combined and dispersed, the final solvent, water, is slowly introduced and represents 141.53 parts by weight. Table 1 is a compilation of the formula of the example shown in parts by weight.

TABLE 1

|  | PARTS BY WEIGHT |
|---|---|
| COMPONENT I | |
| Raw Materials | |
| CHROME OXIDE GREEN | 44.21 |
| COBALT SPINNEL | 30.92 |
| RED IRON OXIDE | 0.77 |

TABLE 1-continued

|  | PARTS BY WEIGHT |
|---|---|
| CARBAZOLE VIOLET (DISPERSION) | 2.25 |
| MAGNESIUM FERRITE | 9.68 |
| ACTIVE FLATTENING AGENT (POLYMERIC BEADS) | 58.28 |
| SOLVENT - DISTILLED WATER | 108.97 |
| VEHICLE - HYDROXYL FUNCTIONAL POLYURETHANE | 189.88 |
| DEFOAMER - EMULSION OF HYDROPHOBIC SOLIDS | 1.18 |
| ANTI-FLOATING-MICRO-MILLED CALCIUM CARBONATE | 1.49 |
| ANTI-SETTLING AGENT (6.0% solids) | 74.121 |
| DISPERSING AGENT | 2.24 |
| EMULSION - NONIONIC EMULSION 35% SOLIDS | 38.73 |
| ADHESION PROMOTER - MERCAPTOPROPYLTRIMETHOXYSILANE | 3.67 |
| COMPONENT II | |
| POLYISOCYANATE | 104.31–191.25 |
| SOLVENT - ALKYL ACETATE | 34.77–63.75 |
| COMPONENT III | |
| SOLVENT - DISTILLED WATER | 141.53 |
| TOTAL WEIGHT | 943.11 |

The function of the components and subcomponents of the invention behave in such a manner to provide chemical agent resistance and camouflage properties. The prime pigments Chrome Oxide, Colbalt Spinel, Magnesium Ferrite, Red Iron Oxide and Carbozle Violet are primarily for chroma, hue and saturation for a camouflage green. The cobalt spinel and chrome oxide are used specifically to simulate the chlorophyll reflectance curve detected in the near-infrared region. Polymeric beads may be of a urea methanal condensate type or any variety of polymeric or synthetic type which may be solid, pigmented, coated and/or vesiculated and range from $\leq 1$ um to 100 um with respect to particle size distribution.

The pigmentation of this invention may be changed or altered to account for specific camouflage applications and/or scenarios that may present themselves, therefore alternative formulations which are in accordance to this invention may be processed in a similar fashion. Exact chroma, hue and saturation of the respective colors may be found in the military specification entitled: "Coating Aliphatic Polyurethanes, Chemical Agent Resistant MIL-C-46168D (ME)", 21 May 1987, listed in Section 1.2.1 Colors, and more definitely in Table V titled Pigmentation.

FIG. 2 is a table of color reflectance performance data and tristmulus values obtained for a coating of the composition of the preferred embodiment with various pigments. The tristimulus values and data provide an exact color space for each specified camouflage color and the allowable minimum/maximum of infrared reflectance for those colors.

The wavelengths disclosed in the table of FIG. 2, under listed "Infrared Min." and "Infrared Max." are defined by selected ordinates for determining infrared and red reflectance values from spectrophotometric ordinates as follows in Table 2:

TABLE 2

| Magenta Red Region Nanometers | Infrared Region Nanometers | |
|---|---|---|
| 620 × 1 | 720 | 800 |
| 630 × 1 | 740 | 810 |
| 640 × 2 | 760 | 830 |
| 650 × 3 | 770 | 840 |
| 660 × 3 | 780 | 860 |

The ratio disclosed in the table of FIG. 2 under "Allowable ratio min." was calculated by dividing the value of the infrared by the value of the red spectral range.

FIG. 3 is a table of spectra reflectance limit data obtained for a coating utilizing the composition of the preferred embodiment with pigments DARK GREEN 34082 and GREEN 383, 34094. The spectra reflectance curve from 600–900 simulates the chlorophyll tunnel which background foliage such as grass, leaves, etc. generate. To remain undetected from near IR sensors, dark green and 383 green must conform to these reflectance minimum/maximum requirements.

Specular gloss requirements for various pigmentation's would be as shown in Table 3:

TABLE 3

| Dark Sandstone 33510, Sand 33303, Earth Yellow 33245 and Tan 33446: | |
|---|---|
| 60° | 1.5 |
| 85° | 3.5 |
| Other Camouflage Colors: | |
| 60° | 1.0 |
| 85° | 3.5 |
| Aircraft Green 34031 and Interior Aircraft Black 32031: | |
| 60° | .5 |
| 85° | 1.0 |
| Other Colors: | |
| 60° | 3.0 |
| 85° | 8.0 |

Low reflectance type coatings, as defined for the purpose of the invention, must impart low gloss to remain undetected visually. This table defines maximum gloss limits for the particular colors listed. It should be noted that reflectance properties, gloss and tristimulus values given in preceding examples do not limit the invention in any way, and the coating in accordance to the invention may be formulated to exact specific end-user demands.

Weathering performance of a resultant coating utilizing the composition of the preferred embodiment was conducted, where the source was a xenon light. Randomly selected commercial batch samples of two-component polyurethanes were provided as a comparative baseline. Samples were tested until they exceeded the 2.5 NBS color change limit currently used for two-component polyurethanes in MIL-C-46168. The resultant coating weathered for 2,400 hr and the standard weathered only 600 hr before failure in the Xenon Weather meter. The data suggests that the preferred embodiment is significantly more colorfast and weather resistant than standard control in an accelerated weathering test. The Xenon exposure is a current requirement for the current CARC material.

Other properties include: outstanding flexibility in sub-zero conditions and excellent mar/abrasion resistance, hydrocarbon fluid, water and impact resistance. Therefore, the present coating would provide a more flexible environmentally compliant chemical resistant coating that can provide a basis for extended longevity of a coating system due to it's chemical resistance, ease in washability and it's exceptional durability with respect to mar and abrasion resistance. The composition may be applied to primed ferrous and nonferrous surfaces or composite type materials. The composition may also be applied to composite ferrous and non-ferrous substrates as a topcoat for camouflage purposes. It is understood that the invention is not limited to a specific substrate or level of coat. The properties of flexibility and mar resistance are unparalleled with respect to a coating that is chemical agent resistant.

This resultant composition of the invention allows for an environmentally compliant water dispersible coating which can be applied in localities which the current CARC exceeds Volatile Organic Compound (VOC) limits. Current CARC is available at 3.5 lbs/gal. Most areas which have restriction are at 2.5–1.8 lbs/gal requirements. The current invention is from 4.0–1.5 lbs/gal. The composition of the present invention provides a material which can exceed all federal and local regulations resulting from the clean air act and it's amendments restricting the amount of VOCs may be applied with minimal restriction due to it's inherent formulation.

The resultant coating using the composition of the invention provides a coating that endures a lower limit of –60° F. (–51° C.)±5° F. on a ⅛" mandrel flexibility test according to ASTM D522 Method B—Cylindrical Mandrel Test without failure. The resultant coating provides a coating with gloss values of ≦1 unit at 60° gloss and ≦3.5 units at 85° sheen and resist mar and burnishing while providing exceptional weathering resistance. The current water dispersible coatings formulations impart mar and burnishing resistance that far exceeds our present Mil Spec material. The current invention when tested according to MIL-C-46168D paragraph 4.3.22 is able to exceed the pass/fail criteria by a minimum of 400 cycles to a maximum of 800 cycles.

While this invention has been described in terms of preferred embodiment consisting of a water dispersible low-reflectance coating composition, those skilled in the art will recognize that the invention can be practiced with modification within the spirit and scope of the appended claims.

Having thus described our invention, what We claim as new and desire to secure by Letters Patent is as follows:

1. A water dispersible low-reflectance coating composition comprising:

a first component including, 33.33 weight percent polyester resin, 15.39 weight percent pigments, 10.82 weight percent polymeric beads, 0.2628 weight percent defoamer, 0.26 weight percent micro-milled calcium carbonate, 13.01 weight percent anti-settling agent, 0.3931 weight percent dispersing agent, 19.13 weight percent water solvent, 6.79 weight percent non-ionic high density polyethylene emulsion, 0.643 weight percent adhesion promoter;

a second component including, 75 to 85 weight percent polyisocyanate, 25 to 15 weight percent solvent;

a third component including 100 weight percent water solvent.

2. The water dispersible low-reflectance coating composition of claim 1 wherein in the first component, the pigments are: chrome oxide green, cobalt spinnel, magnesium ferrite, red iron oxide, and carbazole violet.

3. The water dispersible low-reflectance coating composition of claim 1 wherein in the first component, the polymeric beads are a blend of urea methanal condensate and polyurethane beads.

4. The water dispersible low-reflectance coating composition of claim 1 wherein in the first component, the anti-settling agent is a sepiolite mineral.

5. The water dispersible low-reflectance coating composition of claim 1 wherein in the first component, the adhesion promoter is mercaptopropyltrimethoxysilane.

6. The water dispersible low-reflectance coating composition of claim 1 wherein in the first component the polyester resin is a hydroxyl-functional polyurethane.

7. The water dispersible low-reflectance coating composition of claim 1 wherein in the second component the polyisocyanate is a water dispersible polyisocyanate.

8. The water dispersible low-reflectance coating composition of claim 1 wherein in the second component the solvent is alkyl acetate.

9. The water dispersible low-reflectance coating composition of claim 1 wherein in the composition has a Volatile Organic Compound (VOC) of 4.0 to 1.5 pounds per gallon.

* * * * *